United States Patent [19]

Radkowsky

[11] 4,273,613

[45] Jun. 16, 1981

[54] NUCLEAR REACTOR AND METHOD OF OPERATING SAME

[75] Inventor: Alvin Radkowsky, Ramat Gan, Israel

[73] Assignee: Ramot University Authority for Applied Research, Tel Aviv, Israel

[21] Appl. No.: 945,897

[22] Filed: Sep. 26, 1978

[30] Foreign Application Priority Data

Oct. 13, 1977 [IL] Israel .................................. 53122

[51] Int. Cl.³ ............................................ G21C 19/20
[52] U.S. Cl. ...................................... 176/30; 176/17; 176/18; 176/61; 176/78
[58] Field of Search ...................... 176/17, 18, 30, 31, 176/32, 40, 50, 61, 64, 76, 78

[56] References Cited

U.S. PATENT DOCUMENTS

| | | | |
|---|---|---|---|
| 3,393,128 | 7/1968 | Obertelli | 176/78 |
| 3,575,803 | 4/1971 | Greebler | 176/17 |
| 3,598,700 | 8/1971 | Lambert | 176/76 |
| 3,859,165 | 1/1975 | Radkowsky | 176/18 |

*Primary Examiner*—Donald P. Walsh
*Attorney, Agent, or Firm*—Benjamin J. Barish

[57] ABSTRACT

A method of operating a heavy-water moderated nuclear reactor is described enabling a significant portion of the total core power to be derived from burning natural thorium rather than uranium. In the novel method, interior rod positions of the fuel rod clusters are refueled with thorium-containing rod segments to irradiate the thorium until its multiplication factor is built up to about that of natural uranium, and then the irradiated thorium-containing rod segments are removed from the interior rod positions of the cluster and are utilized to refuel exterior rod positions of the cluster. Also described is a nuclear reactor construction wherein the fuel cluster segments have a mechanical fastener arrangement permitting the quick attachment and detachment of the rod segments within the cluster, thereby facilitating the above refueling procedure.

25 Claims, 9 Drawing Figures

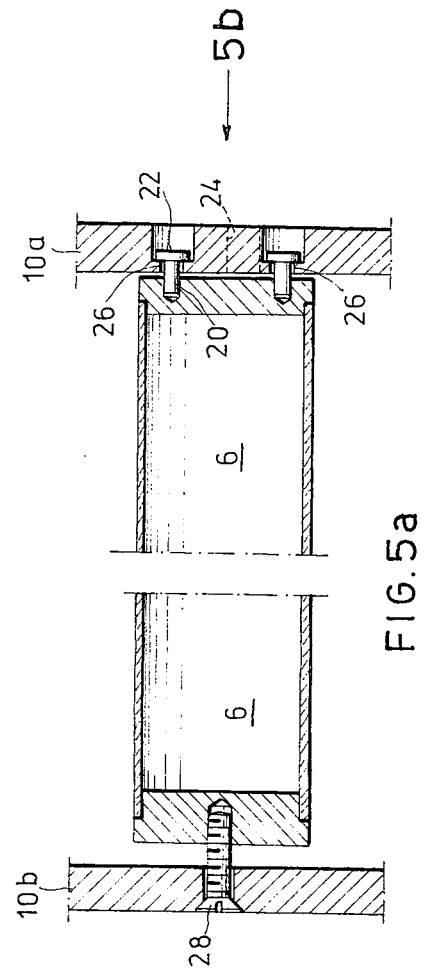
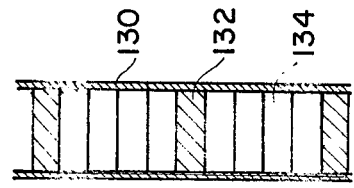
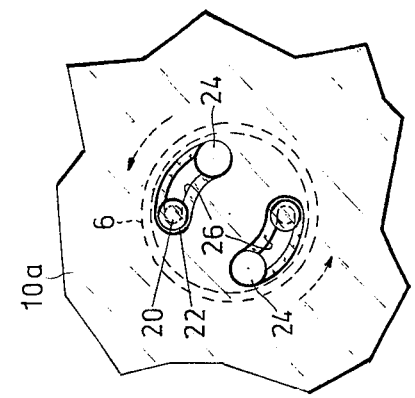
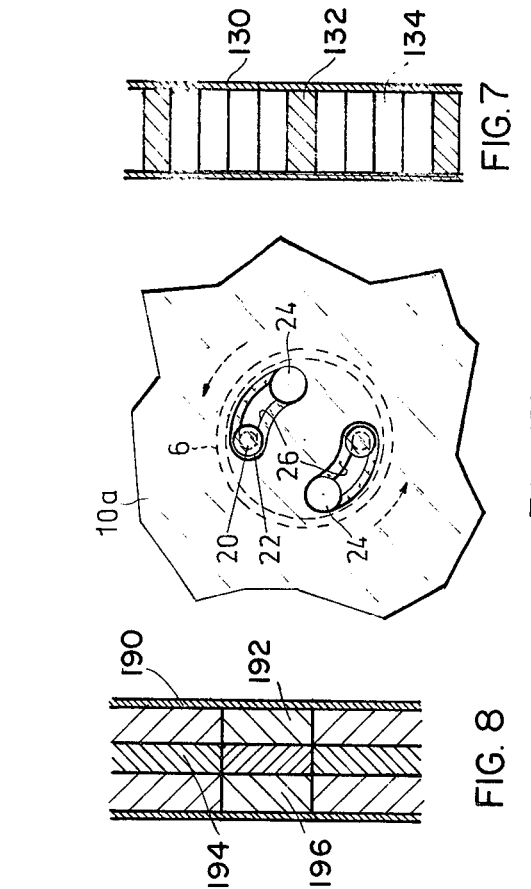
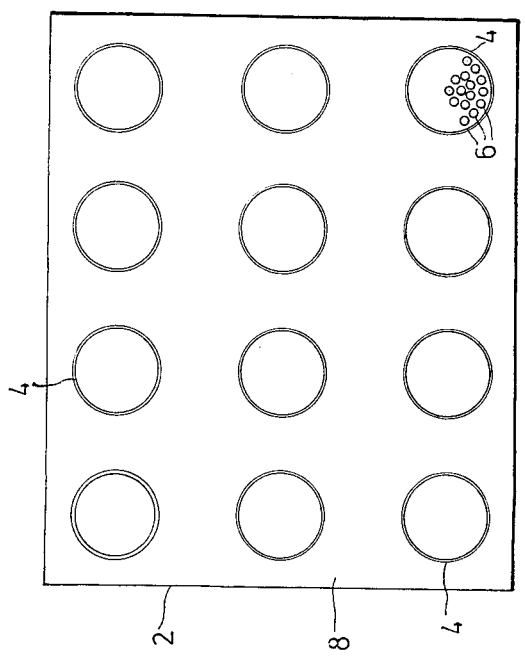
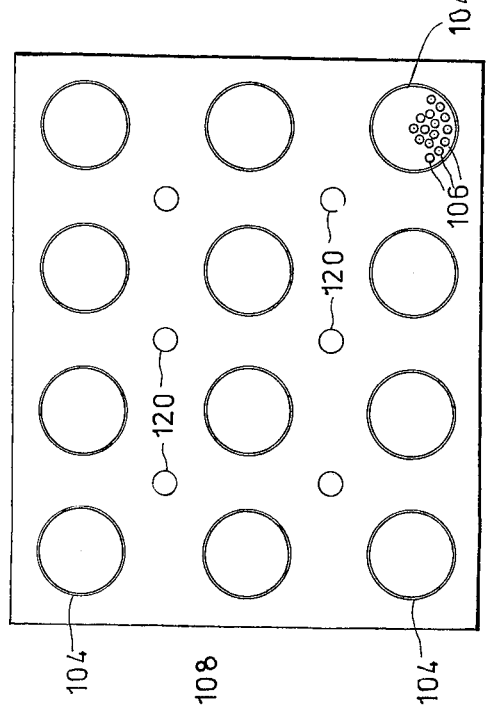

NUCLEAR REACTOR AND METHOD OF OPERATING SAME

BACKGROUND OF THE INVENTION

The present invention relates to a method of operating a nuclear reactor, and also to a nuclear reactor construction enabling it to be operated in accordance with the novel method. The invention is particularly applicable to heavy-water moderated power reactors, and is therefore described below with respect to such application.

Nuclear reactors moderated by heavy water provide a number of advantages as compared to those using ordinary water as a moderator. One advantage is that it is possible to use natural uranium as well as slightly enriched uranium as the fuel. Another advantage is that the burn-up is high. Such reactors, however, are subject to a number of disadvantages, besides the high price of heavy water. Thus, they exhibit a "positive void coefficient," which means that if heavy water is lost, the reactivity rises thereby increasing the danger of a "run-away." In addition, even though the burn-up rate is high, such reactors still require large amounts of natural uranium, the present supplies of which are extremely limited.

OBJECTS AND SUMMARY OF THE INVENTION

An object of the present invention is to provide a nuclear reactor, and a method of operating a reactor, providing advantages in the above respects. More particularly, an object of the present invention is to provide a method of operating a nuclear reactor, and a reactor construction enabling such operation, in which a significant portion of the total core power is derived from burning natural thorium, rather than uranium. Thorium-232 (which constitutes nearly 100% of natural thorium) is converted into fissile uranium-233 by the capture of neutrons, the conversion being effected after the lapse of a few days to permit decay of the protactinium produced upon the exposure of the thorium. Because of the relatively high thermal absorption and low resonance capture of irradiated thorium, as compared to natural uranium, applying the invention to heavy-water moderated reactors would remove the present "positive void coefficient" of such reactors, which would thereby reduce the danger of a "run-away" by loss of moderator. In addition, such a reactor construction and operation would have the further important advantage of producing substantial savings in the requirements for uranium.

The invention is applicable to reactors, particularly of the heavy-water moderated type, having an active core comprising a pressure tube including a cluster of fuel rods of fissile-material (particularly natural uranium) rod segments, some of which rods occupy exterior positions in the cluster and the remainder of which rods occupy interior positions in the cluster.

According to a broad aspect of the present invention, there is provided a method of operating a nuclear reactor of the above type, comprising the Phases: (A) providing interior rod positions at one end of the cluster with thorium-containing rod segments to irradiate the thorium until its multiplication factor is built up to about that of natural uranium; and (B) utilizing the thorium-containing rod segments irradiated in the interior rod positions of the cluster to refuel exterior rod positions at the charge end of the cluster.

In the preferred embodiment of the invention described below, the method includes, after Phase B, the further Phase C of removing depleted thorium-containing rod segments from the discharge end of exterior rod positions of the cluster and utilizing them to refuel interior rod positions at the charge end of the cluster. After all the interior and exterior rod positions have been refueled with thorium-containing segments during Phase C, fresh thorium-containing rod segments are periodically introduced into the interior rod positions of the cluster to replace rod segments whose thorium has reached its irradiation limit.

The method may include the further step of providing, in Phase A, booster rods of enriched uranium in the moderator in order to increase the reactivity of the core, thereby permitting an increase in the number of thorium-containing rod segments irradiated in Phase A to shorten the transition to Phase B.

According to another aspect of the present invention, there is provided a nuclear reactor adapted to be operated in accordance with the above described method, the nuclear reactor having an active core comprising a pressure tube including a cluster of fuel rods some of which occupy exterior positions and the remainder of which occupy interior positions in the cluster. The cluster of rods is constituted of a plurality of cluster segments each including a pair of end plates and a plurality of rod segments attached thereto to extend therebetween. The rod segments and the end plates include cooperable mechanical fastener devices permitting the quick attachment and detachment of the rod segments to the end plates to enable refueling the reactor as set forth.

In the preferred embodiment described below, the cooperable mechanical fastener devices include bayonet pins carried by the rod segments receivable in bayonet slots formed in the end plates.

BRIEF DESCRIPTION OF THE DRAWINGS

The invention is herein described by way of example only, with reference to the accompanying drawings, wherein:

FIG. 1 illustrates the reactor core of a heavy-water moderated power reactor in which the invention is particularly useful;

FIGS. 5a and 5b illustrate one construction that may be used for permitting the quick attachment and detachment of the fuel rod segments in the cluster segment of FIG. 3 to enable refueling the reactor in accordance with the present invention;

FIG. 6 illustrates a variation in the reactor core of FIG. 1 for modifying the operation of the reactor in order to shorten the transaction to the thorium cycle; and FIGS. 7 and 8 illustrate variations in the construction of the thorium-containing rod segments used for refueling the interior positions in Phase A.

DESCRIPTION OF THE PREFERRED EMBODIMENT

Figures 2, 3, 4:
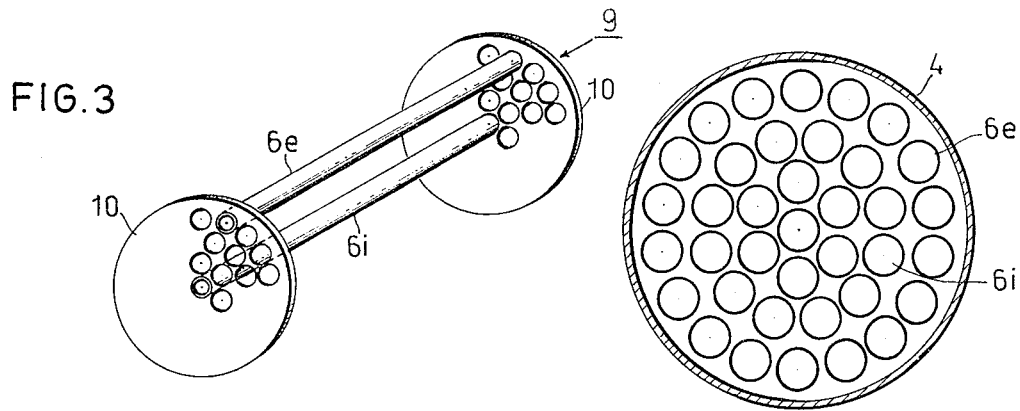
FIG. 2 illustrates one of the pressure tubes in the reactor core of FIG. 1.
FIG. 3 illustrates one of the cluster segments used for making up the cluster of fuel rods included in the pressure tube of FIG. 2.
FIG. 4 illustrates the various phases in the operation of a nuclear reactor in accordance with the present invention.

For purposes of example, the invention is described herein with respect to the heavy-water moderated power reactor following the design of the CAN-DU Plant at Douglas Point in Canada, or of its predecessor, the NPD-2 (Canadian Nuclear Power Demonstration) reactor completed in 1962. Both reactors are of the pressure-tube type utilizing heavy water at a pressure of about 1150 pounds per square inch as the moderator and coolant. The fuel is normal uranium dioxide jacketed in zirconium alloy supported in horizontal tubes of the same alloy. The coolant leaves the reactor at 277° C. (530° F.) and produces steam at about 230° C. (446° F.) in a heat exchanger. The NPD-2 reactor produced a gross electrical power output of 22 megawatts with a thermal efficiency of around 25%; whereas the CAN-DU plant produces over 100 megawatts of electrical power at a thermal efficiency of about 29%.

FIG. 1 schematically illustrates the core in such a reactor. It includes a large tank or vessel, generally designated 2, pierced with a number of tubes 4, called calandria tubes. Each tube 4 includes a cluster of fuel rods 6 of fissile-material-containing elements, usually natural uranium, or in some instances, very slightly enriched uranium. The tank is filled with heavy water at ordinary pressure which fills the space between the tubes 4 and thereby serves as the moderator, remaining essentially at ordinary temperature. The tubes 4, enclosing the fuel rods 6, are filled with the coolant, also heavy water, under a pressure of 500 to 1500 pounds per square inch, the coolant flowing in the annular channels between the fuel rods 6 and the inner wall of the tubes.

As more particularly shown in FIG. 2, there are 37 fuel rods 6 in each of the pressure tubes 4. Of these, 19 fuel rods occupy exterior positions in the cluster (these being indicated as rods 6e), and 18 fuel rods occupy interior positions in the cluster (these being indicated as rods 6i).

Further details of the construction and operation of such reactors are readily available in the published literature, and therefore are not set forth herein.

One characteristic of the above-type reactor is its ability to be refueled on-line, i.e., while the reactor is operating at full power. Another characteristic is that the exterior rods 6e are subject to a high thermal flux distribution, but to a low flux distribution of fast neutrons (i.e. neutrons above thermal); whereas the interior rods 6i are subject just to the opposite, namely to a low thermal flux distribution but to a high fast-neutron flux distribution. Both of the above characteristics are exploited by the present invention in order to operate the reactor so as to shift it from a uranium cycle to a thorium cycle, thereby decreasing both the consumption of natural uranium and the danger of a "run-away" should there be a loss of heavy water.

The on-line refueling is effected by providing the fuel rods 6 within each pressure tube 4 in the form of a plurality of cluster segments, each as shown in FIG. 3. Each segment 9 includes a pair of circular end plates 10 having the rods 6 (both the exteriorly-positioned ones 6e and the interiorly-positioned ones 6i) in the form of segments extending between the end plates 10. The present practice in existing reactors of this type is to form the cluster segments 9 by welding the rod segments 6 to the end walls 10, to refuel the reactor by inserting a cluster segment of new fuel at the charge end and withdrawing a cluster segment of depleted fuel from the discharge end while the reactor is in normal operation, and to discard each cluster as it is removed from the discharge end.

As distinguished from the existing reactors of this type, in the illustrated embodiment of the present invention the rod segments 6 are detachably carried by the end plates 10 to enable them to be conveniently removed and reattached in order to modify the cluster segments used for refueling the reactor at the charge end of the core. This permits the reactor to be operated in such a manner as to provide a gradual shift-over from a normal uranium cycle to a thorium cycle. The shift-over is effected by exploiting the above-mentioned characteristic of reactors of this type in which the fast-neutron flux distribution is highest at the interior fuel rods 6i and is lowest at the exterior fuel rods 6e, which flux distribution favors breeding in the interior fuel rods 6i and fuel burn-up in the external fuel rods 6e.

Briefly, there is first inserted, at one end (e.g., the charge end) of the core, a cluster in which some of the interior rod segments (preferably the most interior ones) are of natural thorium; the remaining interior, as well as all the exterior, rod segments are of natural uranium as in the normal practice. There is only a small loss of reactivity since the thorium segments are in a position of low statistical weight. The thorium segments irradiated in the interior rod positions build up in multiplication factor to be about equivalent to natural uranium. The more irradiated thorium that is added, the higher will be the conversion ratio, and the faster will the fresh thorium be built up in multiplication factor.

The above procedure is repeated for each refueling step until the rod segments at the discharge end of the interior positions have been irradiated sufficiently to be close to the maximum multiplication factor. In one example described below, each thorium segment is irradiated for ten refueling steps, and in a second example, it is irradiated for only two refueling steps. The irradiated thorium rod segments are then used for refueling the exterior positions of the cluster until they occupy all the exterior rod positions. As the thorium rod segments in the exterior rod positions are depleted, they are removed from the discharge end of the cluster and are used to refuel the interior positions of the cluster, while the irradiated thorium-containing segments are removed from the discharge end of the interior positions and are used to refuel the charge end of the exterior positions in the cluster.

Whenever a thorium segment has reached its irradiation (metallurgical or reactivity) limit, or whenever the accumulation of fission products reduces the conversion ratio too much, fresh natural thorium segments can be introduced into the interior rod positions of the cluster and, when sufficiently irradiated, can then be used for refueling exterior rod positions as described above.

It should be noted that considerable flexibility is provided in the above procedure for going over to the thorium cycle, depending on how well the nuclear parameters can be chosen. At any point, the change-over to the thorium cycle can be slowed down and some natural uranium introduced in lieu of natural thorium. It should also be noted that, since the conversion ratio will vary radially, each exterior rod position in successive charge clusters could receive irradiated thorium from a distribution over the interior of the entire calandria, so that all the external fuel rods would have approximately the same reactivity effect. The axial variation would not introduce any operational problems. By fuel management, in which certain of the calandria have more recently introduced thorium, greater burn-up can be achieved. The thorium fuel that is finally discharged from the reactor can be stored or buried until such time as it is economically and politically advantageous to extract the contained uranium-233 and fabricate it into fuel elements.

Because of the low excess reactivity under which CAN-DU reactors are operated, the amount of fresh thorium which can be inserted into the reactor is small, and the transition to the thorium cycle will therefore take a number of years. This time period can be shortened by increasing the reactivity, for example by the use of "booster" rods composed of enriched uranium inserted into the moderator. The booster rods may be removed from the reactor when the transition to the thorium cycle is completed.

In a standard CAN-DU reactor having 37 fuel rods 6 in each calandria tube 4, there is enough excess reactivity to replace only two natural uranium rods by thorium rods. The residence time of fuel in such a CAN-DU reactor is one year with about 7500 MWD/R average burn-up. In the two examples described below, the total length of the rod cluster in each calandria tube 4 is about 200 inches, and the length of each segment used for refueling is about 20 inches. Thus, one rod position can be completely converted in ten refueling steps by converting one segment of the rod position during each refueling step.

EXAMPLE 1

Following is one example of a refueling procedure which could be used for converting the above standard CAN-DU reactor from a natural uranium loading to a thorium loading. This procedure is schematically illustrated in FIG. 4 and involves three phases, namely: Phase A, wherein thorium rod segments are irradiated in the interior rod positions of the cluster; Phase B, wherein the irradiated thorium rod segments are used for refueling the rod segments in all the exterior rod positions; and finally, Phase C, wherein the depleted thorium rod segments discharged from the exterior rod positions are used for refueling the remaining interior rod positions, thereby completing the transition to the thorium cycle. As mentioned earlier, both during Phase C and the subsequent operation of the reactor under an all-thorium cycle, fresh thorium segments may be used whenever necessary for refueling the interior rod positions, and after sufficiently irradiated, may then be used for refueling the exterior rod positions.

Since, in this example, there is enough excess reactivity in the reactor to irradiate only two thorium rods, Phase A is divided into a number of subphases in each of which only a fraction (in this case two) of the interior rod positions are refueled with the thorium-containing rod segments. The number of subphases in Phase A would be sufficient to irradiate enough thorium-containing rod segments to refuel the rod segments of all the exterior rod positions of the cluster at each refueling step during the subsequent Phase B. This is schematically illustrated in FIG. 4, wherein Phase A is divided into a plurality of subphases, these being schematically indicated as Subphases A1, A2, it being appreciated that in this example there would be 10 such subphases in Phase A, as will be clear from the description below.

Thus, as shown in FIG. 4, the first Subphase (A1) is started by refueling the charge end of a fraction (2 out of 18) of the interior rod positions (preferably the most interior ones) with natural thorium-containing segments. For simplification purposes, the diagram of FIG. 4 illustrates only 2 interior rod positions 6i to represent the actual 18 interior rod positions, and 2 exterior rod positions to represent the actual 19 exterior rod positions. Accordingly, whereas FIG. 4 illustrates a natural thorium-containing segment used for refueling only one interior rod position, it will be appreciated that this actually represents 2 interior rod positions; and whereas FIG. 4 illustrates a natural uranium-containing segment used for refueling only one interior rod position, it will be appreciated that this actually represents the remaining 16 interior rod positions. In this Subphase A1, all the exterior rod positions 6e are refueled with natural uranium-containing segments.

Subphase A1 involves 10 refueling steps, taking one year to complete, at the end of which 2 thorium rods (schematically illustrated by only one rod position as explained above) will have been built up to the reactivity of natural uranium. Subphase A2 is then started in which the same interior rod positions are loaded with natural thorium at the charge end of the cluster, while the irradiated thorium segments are removed from the discharge end. Thus, at the end of Subphase A2 (end of the second year of operation), thorium-containing segments for two complete rods will have been irradiated and discharged. These are stored, and the process is repeated through nine additional subphases of Phase A (terminating at the end of the eleventh year of operation) at which time thorium-containing segments for 20 rods will have been irradiated and discharged.

This completes Phase A and marks the start of Phase B in which, during each refueling step, the rod segments of all 19 of the exterior rod positions are refueled with thorium-containing segments irradiated during Phase A. Since there are 10 refuelings per year, each refueling involving the replacement of the 10 segments constituting a fuel rod, this Phase B takes one year, at the end of which (end of twelfth year) all the exterior rod positions will have been replaced by irradiated thorium-containing segments.

Phase C begins at the start of the thirteenth year of operation, at which time all 19 of the exterior rod positions, but only 2 of the interior rod positions, are occupied by the thorium-containing segments, the remaining 16 interior positions still being occupied by uranium-containing segments. During this Phase C, the depleted thorium-containing segments removed from the discharge end of the exterior rod positions are used for refueling the charge end of the interior rod positions. In this example, one year is required for refueling two complete interior rod positions. Accordingly at the end of the thirteenth year of operation, 4 interior rod positions will have been refueled with thorium, and at the end of the twentieth year of operation, all 18 interior rod positions will have been refueled with thorium.

It will be appreciated that during Phase C, the irradiated thorium-containing segments from the discharge end of the interior rod positions 6i are used for refueling the charge end of the exterior rod positions 6e. Accordingly, at the end of twenty years of operation, the transition to a thorium cycle in both the interior and exterior rod positions will have been completed.

Whenever, during Phase C or the subsequent thorium cycle operation, a thorium segment has reached its irradiation (metallurgical or reactivity) limit, or whenever the accumulation of fission products reduces the conversion ratio too much, fresh natural thorium segments would be introduced into the interior rod positions of the cluster and, when irradiated sufficiently, would be placed in the exterior rod positions.

In practice, the irradiated thorium-containing rod segments removed from the discharge end of the interior rod positions would be stored long enough for the protactinium to decay into uranium-233 before being introduced into the charge end of the exterior rod positions. This can be conveniently accomplished by introducing, following the completion of the above-described Phase A and before the start of Phase B, one additional refueling step to introduce a delay in the sequence of 36 days (one-tenth year) between refuelings, which is adequate time to permit the protactinium to decay before utilizing the irradiated thorium segments for refueling exterior rod positions in Phase B.

EXAMPLE 2

Detailed calculations indicate that the initial build-up of uranium-233 in fresh natural thorium in interior rod positions is rapid, and therefore the procedure may be considerably shortened from that described in Example 1, wherein each thorium-containing rod segment is irradiated for a total of ten refueling periods (i.e., one year) by providing it at the charge end of the cluster, advancing it one position along the length of the cluster during each refueling step, and removing it from the discharge end for use in refueling the exterior rod positions in Phase B.

Thus, in this Example 2, each thorium-containing rod segment may be irradiated for only two refueling steps, by providing it at one end of the cluster (either the charge end or the discharge end), retaining it in the same position in the cluster during the next refueling step, and then removing it from the same end (charge or discharge) of the cluster for later use in refueling the exterior rod positions in Phase B. One way of conveniently accomplishing this is to insert a cluster of uranium segments but including two thorium-containing segments in internal positions at the charge end of the core and, at the end of the first refueling step, to remove the thorium-containing segments and to replace them by fresh natural uranium segments. The cluster is then moved one position, thereby providing a vacant cluster position at the charge end of the core for the insertion of another cluster containing fresh natural uranium segments plus the two previously-removed thorium-containing segments. The thorium-containing rod segments may be similarly irradiated for two refueling steps in the last position at the discharge end of the cluster.

After two thorium-containing rod segments have been irradiated for the two refueling periods, they may be removed and stored until a sufficient number have been prepared for use in refueling the exterior rod positions in the cluster during Phase B, as discussed above.

It will thus be seen that, when compared to Example 1 above, the procedure set forth in this Example 2 substantially shortens Phase A during which a sufficient number of thorium-containing rod segments are irradiated in interior rod positions of the cluster to enable them to be used for refueling exterior rod positions in the cluster during Phase B. The remainder of the procedure in this Example 2 is otherwise the same as described above with respect to Example 1.

As indicated above, each of the cluster segments 9 (FIG. 3) is constructed to facilitate the attachment and detachment of the rod segments 6 to the end plates 10 to permit the above-described refueling procedure. FIGS. 5a and 5b illustrate, for purposes of example only, one form of arrangement which could be used, in which one end of each of the rod segments 6 includes diametrically-opposed bayonet pins 20 each provided with an enlarged head 22, receivable within large holes 24 formed in end plate 10a, the holes being connected to narrow arcuate slots 26. The other end of each segment 6 is formed with a central threaded bore for receiving a threaded fastener 28 passing through an opening in the other end plate 10b. To attach a desired arrangement of rod segments 6 between the two end plates, it is only necessary to mount the bayonet pin end of all the rod segments to the respective end plate 10a by inserting the enlarged heads 22 of the bayonet pins 20 into the respective large holes 24 in the end plates 10 and rotating the rod segments along the narrow slots 26, and then to attach the other end plate 10b by the use of the threaded fasteners 28.

FIG. 6 of the drawings illustrates a modification in the refueling procedure, in which modification booster rods 120 of enriched uranium are inserted into the heavy-water moderator 108 in order to shorten the time for the complete transition from the uranium cycle to the thorium cycle. By using such boosters, this transition time can be substantially shortened. This utilization of thorium can be enhanced by increasing the heavy-water content in the interior of the calandria pressure tubes 104 in order to increase the fast-neutron flux-capture therein, and thus hasten the build-up in uranium-233 content of the thorium in the fuel rods 106. About 25% increase in the heavy-water content of the interior would be feasible with only a 5% increase in the diameter of the calandria pressure tubes.

The above contemplates that the thorium-containing rod segments 6i used for refueling the interior positions in Phase A consist of pure natural thorium.

However, the conversion of sufficient thorium to uranium-233 to provide enough reactivity for reactor operation may be expedited by irradiating rods having thorium greatly diluted by beryllium. Such a rod construction is illustrated in FIG. 7, wherein it will be seen that it includes a cladding 130, e.g., of zirconium, loaded with thorium-oxide pellets 132 interspersed with a much larger number of beryllium-oxide pellets 134, so that the resonance integral of the thorium would be close to that of the infinite dilute value. In typical cases, about 10%–20% of the pellets would be of thorium-oxide. The absorption of the thorium would be greatly increased over that in all-thorium rods. On the other hand, the beryllium would serve to increase the reactivity effectiveness of the uranium fuel segments of the cluster, thus compensating for the increased absorption of the thorium. In fact, it may be possible to insert two or more of the beryllium-diluted rods near the center of each cluster.

Furthermore, it would probably be necessary to irradiate the beryllium-diluted rods only during the time for a fuel cluster to advance by the distance of one fuel segment. This would also prevent over-heating. By using the bayonet-type fastening arrangement, e.g. as described with respect to FIGS. 5a and 5b, for the beryllium-diluted rods, they could be removed at the charge end and replaced by natural uranium when the associated pressure tube is opened for refueling. At the discharge end, when a cluster is pushed through to the final position, the central uranium rods could be replaced by the beryllium-diluted rods.

When the irradiated rods are disassembled, the irradiated thorium-oxide pellets would be loaded into a rod so as to be interspersed with fresh natural thorium-oxide pellets to produce the desired enrichment. There would, of course, be some uneven heating, but this would probably not be serious in a distance as short as a segment. The beryllium-oxide pellets could be reprocessed as necessary to remove effects of irradiation and helium and lithium, and then re-used.

FIG. 8 illustrates a further modification, as described in my co-pending U.S. patent application Ser. No. 929,078, filed July 28, 1978, wherein the thorium-containing rod segments may be made of pellets 192 of pressed powder or particles, each pellet having a central section 194 of natural uranium particles and an outer annular region 196 of thorium particles. For example, about 30% of the total pellet volume could be constituted of the natural uranium particles in the central section 194. In such an arrangement, the thorium would act to shield the uranium in the resonance region where most of the absorption of neutrons occurs, so that the uranium-238 will absorb relatively few neutrons. On the other hand, in the fast region where cross-sections are small, the thorium would have almost no shielding effect, and the uranium will have a proportionately fast fission factor, which is known to be relatively five times as great as for thorium. Accordingly, there will be a considerable amount of power generated from the thorium at the beginning of life due the natural uranium. On the other hand, little plutonium-239 will be formed in place of uranium-233; and moreover, that little will be more than compensated for by the improvement in the fast effect, so that the ultimate energy from the composite fuel rods will increase over that from pure thorium rods. Another advantage is that, if the fuel discharged from the reactor is ever reprocessed, the uranium will be a combination of U-233 and U-238, which will not be of any use for weapons.

Many other variations, modifications and applications of the described embodiments of the invention will be apparent.

What is claimed is:

1. A method of operating a heavy-water-moderated nuclear reactor having an active core comprising a pressure tube including a cluster of fuel rods of natural-uranium-containing rod segments, some of which rods occupy exterior positions in the cluster and the remainder of which rods occupy interior positions in the cluster, said method comprising the Phases:
    A. providing interior rod positions at one end of the cluster with thorium-containing rod segments to irradiate the thorium until its multiplication factor is built up to about that of natural uranium; and
    B. utilizing said thorium-containing rod segments irradiated in the interior rod positions of the cluster to refuel exterior rod positions at the charge end of the cluster.

2. The method according to claim 1, wherein, during Phase A, the thorium-containing rod segments are refueled from the charge end of the cluster, are advanced along the length of the cluster during each refueling step, and are removed from the dischage end of the cluster for use in refueling the exterior rod positions in Phase B.

3. The method according to claim 1, wherein, during Phase A, the thorium-containing rod segments are refueled from one end of the cluster, are retained in the same position in the cluster during each refueling step, and are removed from the said one end of the cluster for use in refueling the exterior rod positions in Phase B.

4. The method according to claim 3, wherein each thorium-containing rod segment is irradiated only during two refueling steps in Phase A.

5. The method according to claim 1, including after Phase B, the further Phase:
    C. removing depleted thorium-containing rod segments from the discharge end of exterior rod positions of the cluster and utilizing them to refuel interior rod positions at the charge end of the cluster.

6. The method according to claim 5, wherein after all the interior and exterior rod positions have been refueled with thorium-containing segments during Phase C, fresh thorium-containing rod segments are periodically introduced into the interior rod positions of the cluster to replace rod segments whose thorium has reached its irradiation limit.

7. The method according to claim 5, wherein said Phase B is initiated only after a sufficient number of thorium-containing rod segments have been irradiated to refuel the rod segments of all the exterior rod positions at each refueling during Phase B.

8. The method according to claim 7, wherein Phase A includes a number of subphases in each of which only a fraction, less than the total number, of interior rod positions are refueled with said thorium-containing rod segments, the number of subphases in Phase A being sufficient to irradiate enough thorium-containing rod segments to refuel the rod segments of all the exterior rod positions of the cluster at each refueling during the subsequent Phase B.

9. The method according to claim 8, wherein said cluster includes 37 fuel rods, 18 of which occupy interior positions in the cluster and 19 of which occupy exterior positions in the cluster; and wherein Phase A includes 10 subphases in each of which 2 interior rod positions are refueled with said thorium-containing rod segments.

10. The method according to claim 8, wherein, in addition to the number of subphases in Phase A sufficient to irradiate enough thorium-containing rod segments to refuel the rod segments of all the exterior rod positions of the cluster at each refueling during the subsequent Phase B, Phase A includes one additional refueling step to introduce a delay for storing the irradiated segments long enough for the protactinium to decay into Uranium-233 before being utilized to refuel the rod segments of the exterior rod positions in the cluster.

11. The method according to claim 1, wherein the core includes a plurality of said pressurized tubes disposed in a vessel containing a moderator of heavy water, the rods of all of said pressurized tubes being refueled as set forth.

12. The method according to claim 11, including the further step of providing in Phase A booster rods of enriched uranium in the moderator in order to increase the reactivity of the core, thereby permitting an increase in the number of thorium-containing rod segments irradiated in Phase A to shorten the transition to Phase B.

13. The method according to claim 12, wherein said booster rods are subsequently removed.

14. The method according to claim 1, wherein the refueling of the interior positions at one end of the cluster also includes natural uranium-containing rod segments in addition to thorium-containing rod segments.

15. The method according to claim 1, wherein said thorium-containing rod segments used for refueling the interior positions in Phase A consist of pure natural thorium.

16. The method according to claim 1, wherein at least some of said thorium-containing rod segments used for refueling the interior positions in Phase A include thorium diluted with beryllium.

17. The method according to claim 16, wherein said beryllium-diluted rod segments include thorium-oxide pellets interspersed with a larger number of beryllium-oxide pellets such that the resonance integral of the thorium is close to that of the infinite dilute value.

18. The method according to claim 17, wherein the thorium-oxide pellets in the beryllium-diluted rod segments constitute about 10%-20% of the total number of pellets in such segments.

19. The method according to claim 1, wherein said thorium-containing rod segments include centers of natural uranium surrounded by thorium.

20. The method according to claim 19, wherein said thorium-containing rod segments each includes a sleeve having pellets of pressed particles, each of said pellets having a center of natural uranium surrounded by thorium.

21. The method according to claim 20, wherein the natural uranium constitutes about 30% of the total volume of the thorium-containing rod segments.

22. A nuclear reactor adaped to be operated in accordance with the method of claim 1, said nuclear reactor having an active core comprising a pressure tube including a cluster of fuel rods some of which occupy exterior positions and the remainder of which occupy interior positions in the cluster, said cluster of rods being constituted of a plurality of cluster segments each including a pair of end plates and a plurality of rod segments attached thereto to extend therebetween, said rod segments and said end plates including cooperable mechanical fastener devices permitting the quick attachment and detachment of the rod segments to the end plates to enable refueling the reactor as set forth.

23. A nuclear reactor according to claim 22, wherein said cooperable mechanical fastener devices include bayonet pins carried by said rod segments receivable in bayonet slots formed in said end plates.

24. A nuclear reactor according to claim 22, wherein there are a plurality of pressure tubes each including a cluster of fuel rods, said plurality of tubes being disposed in a vessel containing a moderator of heavy water.

25. The nuclear reactor according to claim 24, wherein said vessel further includes booster rods of natural-uranium-containing elements.

* * * * *